(12) United States Patent
Shim et al.

(10) Patent No.: US 7,822,425 B2
(45) Date of Patent: Oct. 26, 2010

(54) SUPL INITIALIZATION MESSAGE IN A LOCATION INFORMATION SYSTEM AND METHOD AND SYSTEM FOR PROCESSING SUPL BY USING THE SAME

(75) Inventors: Dong-Hee Shim, Seoul (KR); Youn-Sung Chu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1029 days.

(21) Appl. No.: 11/390,265

(22) Filed: Mar. 28, 2006

(65) Prior Publication Data
US 2006/0225090 A1    Oct. 5, 2006

(30) Foreign Application Priority Data
Apr. 1, 2005    (KR) .................. 10-2005-0027772

(51) Int. Cl.
*H04W 24/00* (2009.01)
(52) U.S. Cl. .................. 455/456.1; 455/414.12
(58) Field of Classification Search ........... 455/456.1
See application file for complete search history.

(56) References Cited

U.S. PATENT DOCUMENTS

| | | | |
|---|---|---|---|
| 6,707,830 B1 | 3/2004 | Brown et al. | |
| 2004/0203914 A1* | 10/2004 | Kall et al. ............... | 455/456.1 |
| 2005/0250516 A1 | 11/2005 | Shim | |
| 2006/0058042 A1 | 3/2006 | Shim | |

OTHER PUBLICATIONS

OMA, Secure User Plane Location Architecture, Candidate Version 1.0- Nov. 21, 2005, pp. 35,39 and 40.*

"IP-Based Location Services" 3GPP2-Drafts, 2500 Wilson Boulebard, Suite 300, Arlington, Virginia 22201 USA, Jan. 10, 2005, XP040265866, paragraph [06.4], paragraph [06.6], paragraph [7.2.4.1], paragraph [7.2.4.3].

Margaret Livingston, Govind Krishnamurthi: "Mapping of Successful Network-Initiated Roaming Call Flow to Visited SUPL Position Center (V-SPC) Proxy mode" 3GPP2-Drafts, 2500 Wilson Boulevard, Suite 300, Arlington, Virginia 22201 USA, Sep. 20, 2004, pp. 1-5 XP040324399.

Margaret Livingston, Govind Krishnamurthi: "Mapping of Successful Network-Initiated Roaming Call Flow to Visited SUPL Position Center (V-SPC) Proxy mode" 3GPP2-Drafts, 2500 Wilson Boulevard, Suite 300, Arlington, Virginia 22201 USA, Sep. 20, 2004, pp. 1-6 XP040324400.

Open Mobile Alliance: "OMA-AD-SUPL-V1 0-20050719-C: Secure User Plane Location Architecture v1.0"—XP002410620, Jul. 19, 2005, pp. 1-80.

Open Mobile Alliance: "Secure user Plane Location Architecture"—Mar. 5, 2005, XP002571521, Retrieved from the Internet: URL: http://member.openmobilealliance.org/ftp/Public_documents/LOC/Permanent_documents/OMA-AD-SUPL-V1 [retrieved on Mar. 4, 2010], paragraph [03.1], paragraph [6.8.1.3], paragraph [6.8.1.4].

(Continued)

*Primary Examiner*—Charles N Appiah
*Assistant Examiner*—Joy K Contee
(74) *Attorney, Agent, or Firm*—Birch, Stewart, Kolasch & Birch, LLP

(57) ABSTRACT

A SUPL enabled terminal, method and system for processing SUPL are discussed. According to one embodiment, the SUPL enabled terminal includes a processor to process a SUPL location platform (SLP) mode indicator received in a SUPL initiation message, the SLP mode indicator indicating whether the terminal is to operate according to a proxy mode or a non-proxy mode.

5 Claims, 11 Drawing Sheets

OTHER PUBLICATIONS

Secure User Plane Location Service Stage 2 Specification. Draft Version 1.0, OMA LOC SUPL, Dec. 19, 2003, Open Mobile Alliance: "OMA-LOC-SUPL-Spec-stage-2-V1_0-20031219D" Retrieved from the Internet: URL:http://member.openmobilealliance.org/ftp/Public_documents/LOC/2003.

Wuk Kim et al., SUPL_AD_SET_Initiated_Roaming (Reduced Flows), OMA-LOC-SUPL-AD-V1_0-20040507-D, 2004 Open Mobial Alliance Ltd., May 17, 2004—L.3.

* cited by examiner

FIG 2

| Parameter | Presence | Description |
|---|---|---|
| Positioning Method | M(Mandatory) | Defining supported positioning techniques, SET supporting AGPS, SET-based AGPS, automatic GPS, EOTD, AFLT or Enhanced Cell ID |
| (Notification | O(Optional) | Object of this field is to provide a location service (LCS) notification and indication related to privacy to SET |
| SLP Address | M | This parameter provides SLP address. This address is used by SET for setting data connection to SLP |
| Flag | M | This parameter instructs to which SLP SET should be connected according to non-proxy mode and proxy mode |
| QoP | O | location information quality |

FIG 3

```
SUPL-INIT
DEFINITIONS AUTOMATIC TAGS ::=
BEGIN

EXPORTS SUPLINIT, PosMethod;

IMPORTS SLPAddress, QoP
        FORM ULP-Components;

SUPLINIT ::= SEQUENCE {
    posMethod     PosMethod,
    notification  Notification OPTIONAL,
    sLPAddress    SLPAddress,
    flag          Flag,
    qoP           QoP OPTIONAL,
    ...}

PosMethod ::= ENUMERATED {
    agpsSETassisted(0), agpsSETbased(1), agpsSETassistedpref(2),
    agpsSETbasedpref(3), autonomousGPS(4), aFLT(5), eCID(6),
    eOTD(7), noPosition(8), ...
    }

Notification ::= SEQUENCE {
    notificationType  NotificationType,
    encdingType       EncodingType,
    requestorText     OCTET STRING(SIZE (1..maxReqLength)) OPTIONAL,
      notificationText    OCTET STRING(SIZE (1..maxNotifLength)) OPTIONAL,
...}

NotificationType ::= ENUMERATED {
    noNotificationNoVerification(0), notificationOnly(1),
    notificationAndVerficationAllowedNA(2),
      notificationAndVerficationDeniedNA(3), privacyOverride(4),
...}

EncodingType ::= ENUMERATED {ucs2(0), gsmDefault(1),
...} maxReqLength INTEGER ::= 20 maxNotifLength INTEGER ::=
    80 -- maxNotifLength + maxReqLength = 100 to fit into one SMS --

Flag ::= ENUMERATED {
    normal(0), nonProxyRoaming(1)
}

END
```

FIG 4

```
SLPAddress :: = CHOICE {iPAddress   IPAddress,
                       uRL         URL,
...}

URL ::=
   VisiblesString(FROM ("a" .. "z" | "A" .. "Z" | "0" .. "9" | "./-_~%#"))
     (SIZE (1 .. 1000))
```

FIG 5

```
IPAddress ::= CHOICE {
   ipv4Address OCTET STRING (SIZE (4)),
   ipv6Address OCTET STRING (SIZE (16))}
```

FIG 6

```
QoP ::= SEQUENCE {
   horacc INTEGER(0 .. 127),
   veracc INTEGER(0 .. 127) OPTIONAL, -- as defined in 3GPP TS 23.032 "uncertainty altitude" --
   maxLocAge    INTEGER(0 .. 65535) OPTIONAL,
   delay     Delay OPTIONAL,
   ...}

Delay ::= CHOICE {
   delaytype1    Delaytype1, -- as per 22.071 --
       delaytype2    Delaytype2, -- as per 44.031 --
   ...}

Delaytype1 ::= ENUMERATED {noDelay(0), lowDelay(1), delayTolerant(2),
   ...}

-- delay defined as per 3GPP TS 22.071 --
Delaytype2 ::= INTEGER(0 .. 7) -- delay defined as per 44.031--
```

FIG 11

| Parameter | Presence | Description |
| --- | --- | --- |
| Positioning Method | M(Mandatory) | Defining supported positioning techniques, SET supporting AGPS, SET-based AGPS, automatic GPS, EOTD, AFLT or enhanced cell ID |
| Notification | O(Optional) | Object of this field is to provide a location service (LCS) notification and indication related to privacy to SET |
| first SLP address (SLP Address) | M | This parameter provides SLP address. This address is used by SET for setting data connection to SLP |
| second SLP address (SPC Address) | O | This parameter includes SLP address to be connected to share pre-shared key in case of non-proxy mode. This address is used for SET to set data connection to SLP |
| QoP | O | Location information quality |

FIG 12

```
SUPL-INIT
DEFINITIONS AUTOMATIC TAGS ::=
BEGIN

EXPORTS SUPLINIT, PosMethod;

IMPORTS SLPAddress, QoP
        FORM ULP-Components;

SUPLINIT ::= SEQUENCE {
    posMethod       PosMethod,
    notification    Notification OPTIONAL,
    sLPAddress      SLPAddress,
    sPCAddress      SLPAddress, OPTIONAL,
    qoP             QoP OPTIONAL,
    ...}

PosMethod ::= ENUMERATED {
    agpsSETassisted(0), agpsSETbased(1), agpsSETassistedpref(2),
    agpsSETbasedpref(3), autonomousGPS(4), aFLT(5), eCID(6),
    eOTD(7), noPosition(8), ...
    }

Notification ::= SEQUENCE {
    notificationType    NotificationType,
    encdingType         EncodingType,
    requestorText       OCTET STRING(SIZE (1..maxReqLength)) OPTIONAL,
      notificationText  OCTET STRING(SIZE (1..maxNotifLength)) OPTIONAL,
...}

NotificationType ::= ENUMERATED {
    noNotificationNoVerification(0), notificationOnly(1),
    notificationAndVerficationAllowedNA(2),
      notificationAndVerficationDeniedNA(3), privacyOverride(4),
...}

EncodingType ::= ENUMERATED {ucs2(0), gsmDefault(1),
...} maxReqLength INTEGER ::= 20 maxNotifLength INTEGER ::=
    80 -- maxNotifLength + maxReqLength = 100 to fit into one SMS --

END
```

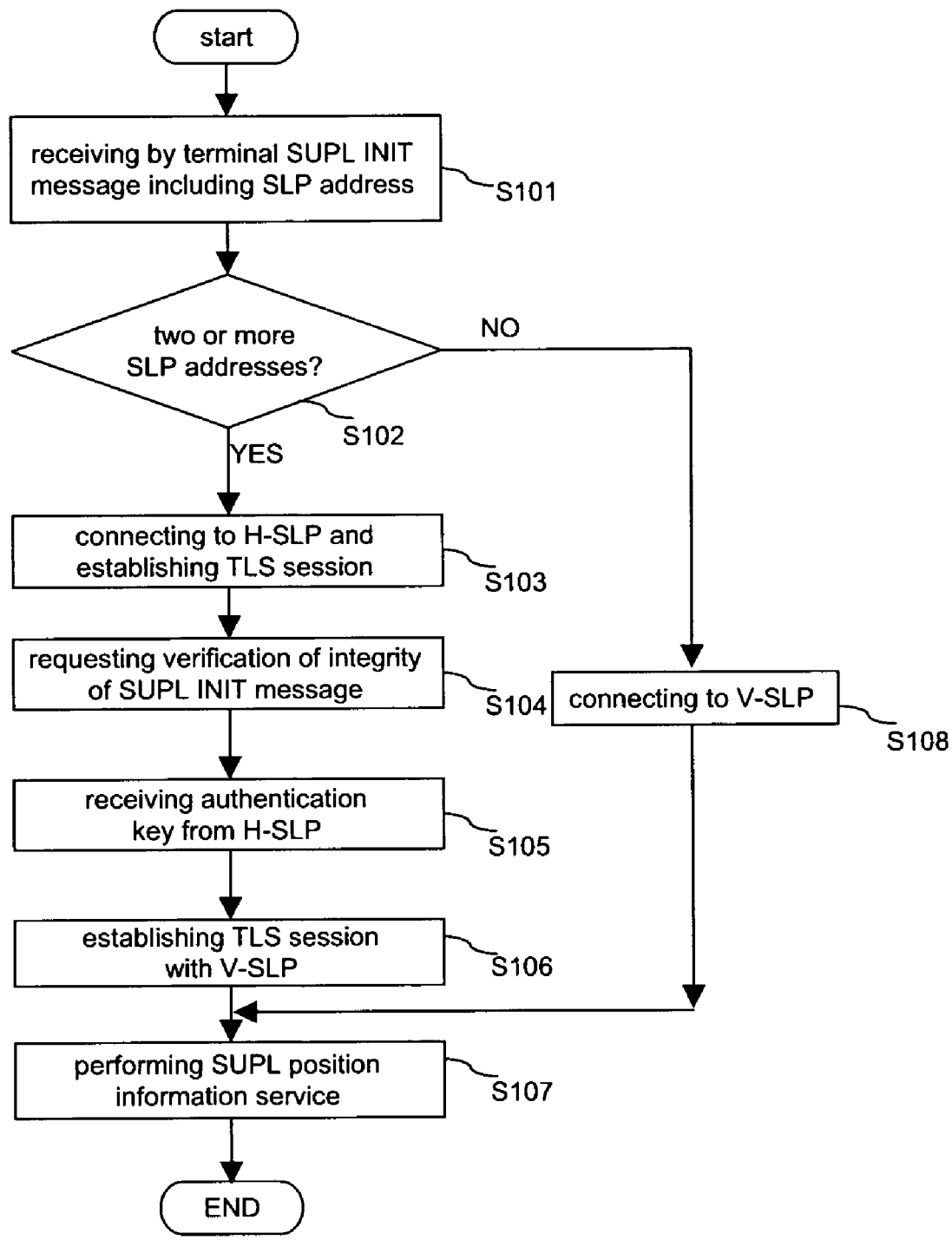

SUPL INITIALIZATION MESSAGE IN A LOCATION INFORMATION SYSTEM AND METHOD AND SYSTEM FOR PROCESSING SUPL BY USING THE SAME

This application claims the priority benefit of Korean Patent Application No. 10-2005-027772 filed on Apr. 1, 2005 in Republic of Korea, which is hereby incorporated by reference for all purposes as if fully set forth herein.

BACKGROUND OF THE INVENTION

1. Field of the Invention

The present invention relates to a location information system based on SUPL (Secure User Plane Location) technology, and more particularly, to a SUPL initiation message for initiating a SUPL procedure for checking a location and a method and a system for providing the SUPL by using the SUPL initiation message.

2. Description of the Related Art

In general, a mobile communication system has a function part for calculating a location of a terminal in a mobile communication network to provide a location service that transfers the location of the terminal to a certain entity in a periodic manner or according to a corresponding request.

A network structure related to the location service differs depending on an internal structure of a particular network such as a 3GPP network, a 3GPP2 network, etc. According to the related art, there are several methods for calculating the position (location) of a mobile terminal, including a cell-ID method for transferring an ID of a cell to which a mobile terminal belongs, a method for calculating a location of a mobile terminal through triangulation by measuring the time required for radio signals to reach each base station from the mobile terminal, and a method of using GPS (Global Positioning System) technology.

In order to provide the location service to a user, a large quantity (amount) of signals and location information are to be transferred between the mobile terminal and a location server. Recently, positioning technologies for providing the location service (namely, location services provided based on a location of a mobile terminal) are increasingly used. These technologies can be provided generally through a user plane and a control plane, one of which is a SUPL (Secure User Plane Location) technique that provides the location service through the user plane.

As an effective method for transferring location information required for calculating a location of the mobile terminal, the SUPL (Secure User Plane Location) uses a user plane data bearer to transfer location assistance information such as GPS assistance and transferring a positioning technology-related protocol between the mobile terminal and a network.

Generally, in the location information system, the SUPL network related to the location service includes a SUPL agent, an SLP (SUPL location platform) and a SET (SUPL Enabled Terminal), etc. The SUPL agent is a logical service access point (AP) using actually measured location information, and the SLP is a SUPL service AP of a network part that accesses network resources to obtain the location information. The SET is a device for communicating with the SUPL network using a SUPL interface, which supports definition procedures in the SUPL by interworking with the network through a user plane data bearer. In this case, the SET can be one of a UE (User Equipment) for UMTS, an MS (mobile Station) for GSM, and a laptop computer or a PDA (Personal Digital Assistant) having the SET function. Alternatively, the SET can refer to various types of mobile terminals connected through the WLAN.

In the location information service, a network to which the user has originally registered is called a home network, and a network of an area to which the user is located after having moved from the home network is called a visited network. An SLP within the home network is called a home SLP (H-SLP), and an SLP within the visited network is called a visited SLP (V-SLP).

When the SUPL procedure is started in the network of the location information system, an SLP first connected by an external client is called a requesting SLP (R-SLP), which is a logical entity that may or may not be the same as the H-SLP. A SET aimed for tracking current location is called a target SET.

The SLP, a network element, generally includes an SPC (SUPL Positioning Center) that calculates actual location information and an SLC (SUPL Location Center) that handles additional functions other than calculating the location information. For example, the SLC performs and/or supports the procedures for roaming, resource management, and the like.

The location information system can be implemented in a non-proxy mode in which the SPC has direct communication with the SET to calculate the location information, and in a proxy mode in which the SPC does not have direct communication with the SET but communicates with the SET via the SLC to calculate the location information. In the proxy mode environment, the SLC operates as a proxy between the SET and SPC.

In the general SUPL-based location information system, an address of the SLP that may be connected by the terminal (SET) to perform the SUPL procedure, can be an IP address based on IPv4 or IPv6 or a URL (Uniform Resource Locator). In case of roaming, the SLP address can be an address of the H-SLP or an address of the V-SPC.

Upon receiving the SLP address, e.g., in a non-proxy mode, the terminal can perform the steps of checking the IP address of the URL included in the SLP address, connecting with the SLP corresponding to the address, opening a session with the corresponding SLP, and performing the SUPL procedure. In this case, in the SUPL procedure of the home network, the SLP to which the terminal is connected is the H-SLP, while in case of roaming, the terminal existing in the visited network should be connected with the V-SLP. The address of the SLP to which the terminal is to be connected may differ depending upon whether the SLP is in the proxy mode or the non-proxy mode.

However, in the general SUPL-based location information system, the SLP address itself does not and cannot be used to discriminate whether it is the address of the H-SLP or the V-SPC, e.g., in case of roaming. As a result, this causes a problem in that the terminal which has received the SLP address cannot accurately determine the particular server to which the terminal should be connected for performing the SUPL procedure and thus may not be able to perform subsequent set-up and other operations effectively. That is, since different steps may need to be taken to perform the SUPL procedure depending on whether the system is in a proxy mode or a non-proxy mode, just receiving an SLP address is not enough for the terminal to know in what capacity the SLP address should be used.

In addition, in the general SUPL-based location information system, in case of non-proxy roaming, the terminal, which has received a SUPL initiation message containing an SLP address, cannot discriminate (1) whether to be connected directly to the V-SPC by using the SLP address (which is the V-SPC address) included in the SUPL initiation message or (2) whether to open a session with the H-SLP, receive an authentication key, and then connect with the V-SPC using the SLP address included in the SUPL initiation message. Additionally, the network part cannot properly inform the terminal about what it should do.

SUMMARY OF THE INVENTION

One aspect of the present invention involves the recognition by the present inventors of the drawbacks in the related art, as explained above in part. Based upon such recognition, improvements to the related art SUPL processing procedures have been made according to the present invention.

Therefore, one feature of the present invention is to provide a SUPL (Secure User Plane Location) initiation message and a method and system for processing SUPL procedures by using the SUPL initiation message in a location information system capable of allowing a roaming terminal to accurately discriminate the particular server to which the terminal should be connected in order to perform a SUPL location service according to a proxy mode and a non-proxy mode.

Another feature of the present invention is to provide a method and system for allowing a roaming terminal, in case of non-proxy roaming, to discriminate whether to be directly connected with a V-SLP (Visited SUPL Location Platform) and a non-protection channel or whether to receive an authentication key through a TLS (Transport Layer Security) session from an H-SLP (Home SLP) and connect with the V-SLP and a protection channel, in order to perform a SUPL location service.

Another aspect of the present invention is to provide an SLP mode indicator in a SUPL initiation message, and a terminal, system and method for using the SLP mode indicator, which address the limitations and disadvantages associated with the related art.

To achieve at least the above features in whole or in parts, there is provided a SUPL processing system comprising: an H-SLP for adding a parameter for discriminating an SLP to which a roaming terminal, which has received a SUPL initiation message, should be connected in the SUPL initiation message, and transmitting it to the roaming terminal.

To achieve at least these advantages in whole or in parts, there is further provided a SUPL processing system in a location information system in which a terminal has been roamed from an H-SLP to a V-SLP, the SUPL processing system comprising: the terminal for checking an SLP mode indicator included in a received SUPL initiation message and selectively performing an authentication operation with the H-SLP and a SUPL location confirmation operation with the H-SLP.

To achieve at least these advantages in whole or in parts, there is further provided to a SUPL processing system in a location information system in which a terminal has been roamed from an H-SLP to a V-SLP, the SUPL processing comprising: the H-SLP for adding an SLP mode indicator for discriminating an SLP to which the roaming terminal should be connected in a SUPL initiation message and transmitting it to the roaming terminal; and the roaming terminal for checking the SLP mode indicator contained in the SUPL initiation message and determining an SLP to which the terminal should be connected.

To achieve at least these advantages in whole or in parts, there is further provided a SUPL processing method in a location information system in which a terminal has been roamed from an H-SLP to a V-SLP, the method comprising: adding by an H-SLP a parameter for discriminating an SLP to which the terminal should be connected, in a SUPL initiation message and transmitting it to the terminal.

To achieve at least these advantages in whole or in parts, there is further provided a SUPL processing method in a location information system in which a terminal has been roamed from an H-SLP to a V-SLP, the method comprising: determining by the terminal an SLP, to which the terminal should be connected, according to an SLP mode indicator contained in a SUPL initiation message received from the H-SLP.

To achieve at least these advantages in whole or in parts, there is further provided a SUPL processing method in a location information system in which a terminal has been roamed from an H-SLP to a V-SLP, the method comprising: transmitting by the H-SLP a SUPL initiation message containing an SLP mode indicator to the terminal; and checking by the terminal the SLP mode indicator contained in the SUPL initiation message and determining an SLP to which the terminal should be connected.

To achieve at least these advantages in whole or in parts, there is further provided a SUPL initiation message received by a terminal from an H-SLP (Home-SUPL Location Platform), the message comprising: a parameter for indicating an SLP to which the terminal should be connected when the terminal is roamed from the H-SLP to a V-SLP (Visited-SLP).

To achieve at least these advantages in whole or in parts, there is further provided a SUPL processing method in a location information system in which a terminal has been roamed from an H-SLP to a V-SLP, the method comprising: selectively adding by the H-SLP first and second SLP addresses in a SUPL initiation message and transmitting the message to the terminal; and checking by the terminal the first and second SLP addresses contained in the SUPL initiation message and determining an SLP to which the terminal should be connected.

According to an aspect of the present invention, there is provided a secure user plane location (SUPL) enabled terminal comprising: a processor to process a SUPL location platform (SLP) mode indicator received in a SUPL initiation message, the SLP mode indicator indicating whether the terminal is to operate according to a proxy mode or a non-proxy mode.

According to another aspect of the present invention, there is provided a secure user plane location (SUPL) enabled terminal comprising: a processor to process at least one parameter received in a SUPL initiation message to determine a SUPL location platform (SLP) to which the terminal should send a SUPL position initiation message in response to the SUPL initiation message.

According to another aspect of the present invention, there is provided a secure user plane location (SUPL) enabled terminal capable of roaming from a home SUPL location platform (H-SLP) to a visited SLP (V-SLP), the terminal comprising: a processor to check a SLP mode indicator included in a received SUPL initiation message, and to selectively perform an authentication operation with the H-SLP based on the SLP mode indicator.

According to another aspect of the present invention, there is provided a secure user plane location (SUPL) processing system comprising: a home SUPL location platform (H-SLP) to add a parameter into a SUPL initiation message and to transmit the SUPL initiation message including the parameter to a target terminal, the parameter being used to discriminate an SLP to which the target terminal should be connected.

According to another aspect of the present invention, there is provided a secure user plane location (SUPL) processing system comprising: a home SUPL location platform (H-SLP) to add, into a SUPL initiation message, an SLP mode indicator for discriminating an SLP to which a target terminal should be connected, and to transmit the SUPL initiation message including the SLP mode indicator to the target terminal; and the target terminal to check the SLP mode indicator contained in the SUPL initiation message, and to determine an SLP to which the target terminal should be connected based on the SLP mode indicator.

According to another aspect of the present invention, there is provided a method for a secure user plane location (SUPL) enabled terminal, the method comprising: processing, by the terminal, a SUPL location platform (SLP) mode indicator received in a SUPL initiation message, the SLP mode indicator indicating whether the terminal is to operate in a proxy mode or a non-proxy mode.

According to another aspect of the present invention, there is provided a method for a secure user plane location (SUPL) enabled terminal, the method comprising: processing, by the terminal, at least one parameter received in a SUPL initiation message to determine a SUPL location platform (SLP) to which the terminal should send a SUPL position initiation message in response to the SUPL initiation message.

According to another aspect of the present invention, there is provided a method for a secure user plane location (SUPL) enabled terminal capable of roaming from a home SUPL location platform (H-SLP) to a visited SLP (V-SLP), the method comprising: checking, by the terminal, a SLP mode indicator included in a received SUPL initiation message; and selectively performing, by the terminal, an authentication operation with the H-SLP based on the SLP mode indicator.

According to another aspect of the present invention, there is provided a method for processing a secure user plane location (SUPL) request in a SUPL system including a home SUPL location platform (H-SLP), the method comprising: adding, by the H-SLP, a parameter into a SUPL initiation message; and transmitting, by the H-SLP, the SUPL initiation message including the parameter to a target terminal, the parameter being used to discriminate an SLP to which the target terminal should be connected.

According to another aspect of the present invention, there is provided a method for processing a secure user plane location (SUPL) request in a SUPL system, the SUPL system including a home SUPL location platform (H-SLP) and a target terminal, the method comprising: adding, by the H-SLP, an SLP mode indicator for discriminating an SLP to which the target terminal should be connected, into a SUPL initiation message; transmitting, by the H-SLP, the SUPL initiation message including the SLP mode indicator to the target terminal; checking, by the target terminal, the SLP mode indicator contained in the SUPL initiation message; and determining, by the target terminal, an SLP to which the target terminal should be connected based on the SLP mode indicator.

According to another aspect of the present invention, there is provided a computer program product embodied on at least one computer-readable medium, for processing a secure user plane location (SUPL) request using a SUPL enabled terminal, the product comprising computer-executable instructions for: processing, by the terminal, a SUPL location platform (SLP) mode indicator received in a SUPL initiation message, the SLP mode indicator indicating whether the terminal is to operate in a proxy mode or a non-proxy mode.

Additional advantages and features of the invention will be set forth in part in the description which follows and in part will become apparent to those having ordinary skill in the art upon examination of the following or may be learned from practice of the invention. The features and advantages of the invention may be realized and attained as particularly pointed out in the appended claims.

BRIEF DESCRIPTION OF THE DRAWINGS

FIG. 2 is a view showing an example of a format of a SUPL initiation message in accordance with an embodiment of the present invention;

FIG. 3 is a view showing an example of a SUPL initiation message encoded by ASN.1 (Abstract Syntax Notation 1) in accordance with an embodiment of the present invention;

FIG. 4 is a view showing an example of an SLP address encoded by the ASN.1 of the SUPL initiation message according to an embodiment of the present invention;

FIG. 5 is a view showing an example of an IP address encoded by the ANS.1 included in the SLP address according to an embodiment of the present invention;

FIG. 6 is a view showing an example of a QoP parameter encoded by the ASN.1 of the SUPL initiation message according to an embodiment of the present invention;

FIG. 11 shows another example of a format of a SUPL initiation message in accordance with an embodiment of the present invention;

FIG. 12 is a view showing an example of the SUPL initiation message encoded by the ASN.1 according to an embodiment of the present invention; and FIG. 13 is a flow chart illustrating the process of a SUPL processing method of the SET which has received the SUPL initiation message in accordance with an embodiment of the present invention.

DETAILED DESCRIPTION OF THE PREFERRED EMBODIMENTS

Figure 1:
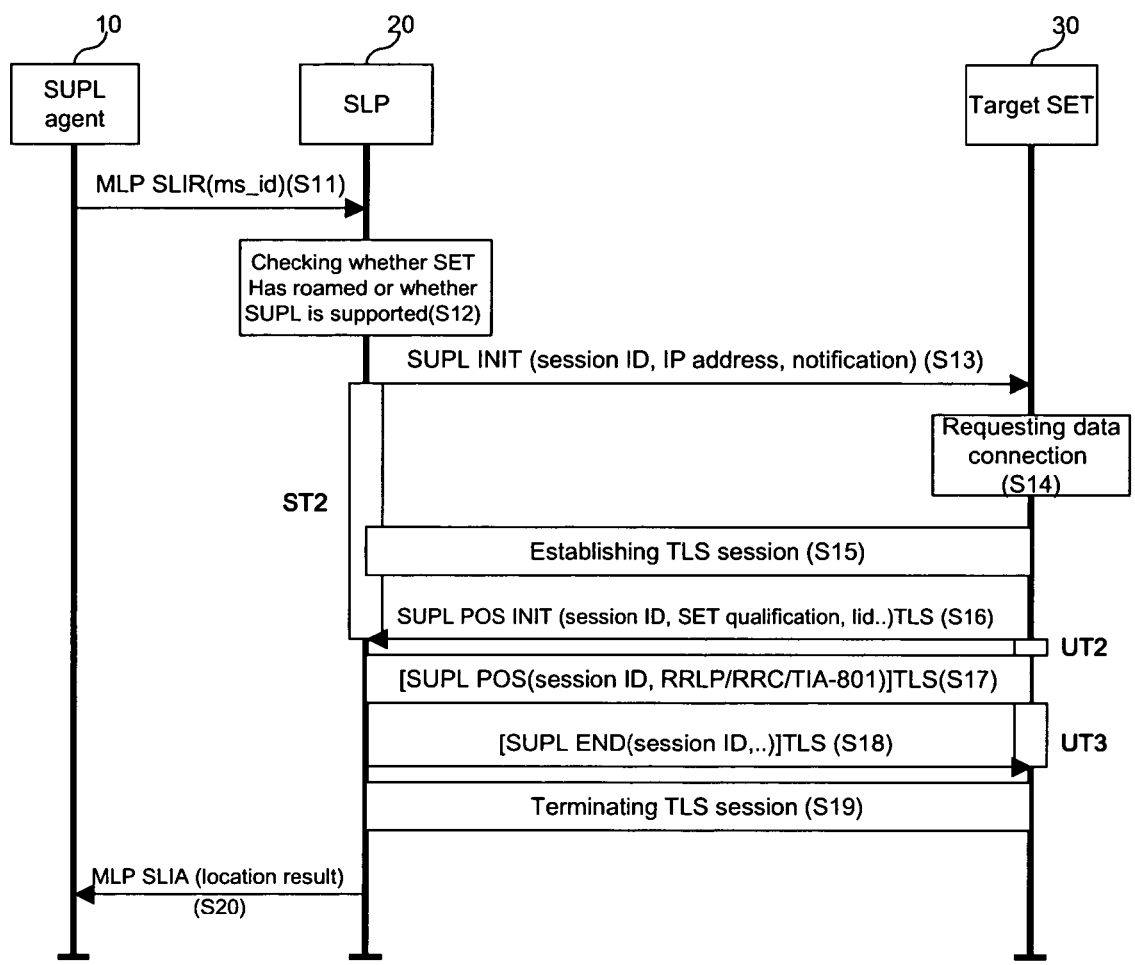
FIG. 1 is a view showing one example of a general SUPL processing method.

SUPL initiation message in a location information system and a SUPL processing terminal, computer software, method and system using the SUPL initiation message in accordance with the preferred embodiments of the present invention will be described with reference to the accompanying drawings.

The present invention provides a SUPL initiation (SUPL INIT) message of a new format to allow a terminal to discriminate (distinguish) an SLP to which the terminal should be connected to perform a SUPL location information service according to a proxy mode and a non-proxy mode. The present invention also focuses on cases that the terminal is roamed from an H-SLP to a V-SLP in a SUPL-based location information system, only as examples.

In a non-proxy mode, a SPC has direct communication with the terminal (SET) to calculate the location information, whereas in a proxy mode, the SPC does not have direct communication with the terminal but communicates with the terminal via the SLC to calculate the location information. In the proxy mode environment, the SLC operates as a proxy between the terminal and SPC. Proxy and non-proxy modes are present in both roaming and non-roaming cases.

In the SUPL-based location information system according to the present invention, the H-SLP (e.g., a home network server) adds, into a SUPL initiation (SUPL INIT) message, an SLP address having an address value with respect to an SLP to which the roaming terminal should be connected for performing a SUPL procedure, and an SLP mode indicator for indicating the SLP to which the roaming terminal should be connected depending on whether the system (e.g., H-SLP) is operating in the proxy mode or the non-proxy mode. Then the H-SLP transmits such SUPL initiation message to the roaming terminal. Then, the roaming terminal checks the SLP mode indicator contained in the received SUPL initiation message and determines an SLP to which the terminal should be connected based on the SLP mode indicator.

Accordingly, in the present invention, the SUPL initiation message contains at least the SLP mode indicator for discriminating the SLP to which the terminal should be connected according to the proxy mode or non-proxy mode of the system. According to an embodiment, the SLP mode indicator can have a first value for indicating a non-proxy mode or a second value for indicating a proxy mode.

When the SLP mode indicator has the first value and thus indicates a non-proxy mode, the roaming terminal determines that the H-SLP is using the non-proxy mode. Thus, the roaming terminal stores the SLP address (e.g., a V-SPC address) contained in the SUPL initiation message, connects with the H-SLP using a provisioned SLP address (e.g., from the home network) to receive an authentication key, establishes a TLS (Transport Layer Security) or other security session based on the authentication key with the V-SPC using the stored SLP (V-SPC in this example) address, and transmits a SUPL position (SUPL POS) initiation message (or the like).

When the SLP mode indicator has a second value and thus indicates a proxy mode, the roaming terminal determines that the H-SLP is using the proxy mode, so the terminal may directly transmit the SUPL position initiation (SUPL POS INIT) message to the H-SLP using a SLP address value provisioned to the terminal from the home network such as the H-SLP.

According to another embodiment, the present invention provides a SUPL initiation message which include at least one of a first SLP address to which a connection should be made by the roaming terminal to perform a SUPL position confirmation procedure, and a second SLP address (e.g., SPC address) to which a connection should be made by the roaming terminal to share the authentication key. Namely, in the SUPL-based location information system in accordance with another embodiment of the present invention, in order to instruct the SUPL operation mode to be used, the H-SLP adds the first and second SLP addresses into the SUPL initiation message and transmits the SUPL initiation message including the first and second SLP addresses to the terminal.

According to this embodiment, the terminal can recognize which operation should be performed when the mode of the system is in a non-proxy mode, depending upon whether the received SUPL initiation message contains the first SLP address (e.g., the V-SPC address) or both the first SLP address and the second SLP address (e.g., the H-SLP address). For instance, if the first SLP address is present, then the terminal may determine that the system is operating in a non-proxy mode. Then the second SLP address identifies the SLP address of an SLP to which the terminal should be connected to receive the authentication key. As a result, according to whether the received SUPL initiation message contains the first SLP address (without the second SLP address) or both the first and second SLP addresses, the terminal determines either to immediately set the non-protection channel with the V-SLP or to set the protection channel with the V-SLP after undergoing authentication of the H-SLP.

That is, in case of non-proxy roaming, the SUPL initiation message of the new format according to the present invention allows the roaming terminal to discriminate (a) whether to set a non-protection channel directly with the V-SLP to perform the SUPL location information service or (b) whether to connect with the H-SLP to receive an authentication key, open a protection channel with the V-SLP, and perform the SUPL location information service through the protection channel.

FIG. 1 is a view showing one example of a general SUPL processing method, namely, a SUPL performing procedure in a home network according to a proxy mode.

As shown in FIG. 1, the SUPL-based location information system includes a SUPL agent 10, an SLP 20 and a target SET 30 whose functions are as described above. The SLP 20 can be considered as a server and the target SET 30 can be considered as a target terminal. The target SET will be mentioned simply as SET hereinafter.

When the SUPL agent 10 transmits an MLP (Mobile Location Protocol) SLIP (Standard Location Immediate Request) message to the SLP 20 in order to request location information regarding the target SET 30 (step S11), the SLP 20 checks whether the SET 30 is a roaming terminal or not and also whether the SET 30 supports the SUPL or not (step S12). In this case, the MLP SLIP message includes an ID of the SET.

The SLP 20 starts the SUPL procedure with the SET 30 by transmitting a SUPL initiation message (SUPL INIT) to the SET 30 (step S13). In this case, the SUPL initiation message may include a session ID, an IP address, a location tracking method to be used, and the like. In addition, it can include a parameter for a case where a notification related to the location information is to be provided to a user after checking privacy of the SET 30 by the SLP 20.

If the SET 30, which has received the SUPL initiation message, is not currently opened for data connection to any network, the SET 30 requests data connection from a packet data network such as a 3GPP or a 3GPP2 network (step S14) and sets the protection channel, namely, a transport layer security (TLS) session, with the SLP 20 (step SI 5). In this case, if there is a pre-shared key (PSK) shared by the SLP 20 and the SET 30 or if the use of a GBA (Generic Bootstrapping Architecture) has been agreed upon, the SET 30 establishes the session by using the PSK-TLS.

After the SET 30 transmits the SUPL position initiation (SUPL POS INIT) message to the SLP 20 to start the actual location tracking procedure (step S16), the SET 30 and the SLP 20 continuously exchange messages to perform the actual location tracking, and the SLP 20 or the SET 30 calculates the location of the SET 30 through the continuous communication of messages (step S17). At this time, the SUPL POS INIT may include a session ID, an LID (Local Identifier), SET capabilities, and the like, and the messages exchanged between the SET 30 and the SLP 20 are location messages, each of which may include a session ID, a protocol (RRLP, RRC or TIA-801) to be used for location tracking, and the like.

When the location of the SET 30 is calculated, the SLP 20 transmits a SUPL end message for informing about the termination of the SUPL procedure to the SET 30 (step S18) and closes the TLS session between the SET 30 and the SLP 20

(step S19). And the SLP transmits the location information result of the SET to the SUPL agent 10 through an MLP SLIA message (step S20).

In FIG. 1, a ST2 of the SLP 20 refers to the time required for receiving the SUPL position initiation (POS INIT) message by the SLP 20 after transmitting the SUPL initiation message, a UT2 of the SET 30 refers to the time taken for exchanging (receiving) the first SUPL position message by the SET 30 after transmitting the SUPL position initiation message, and a UT3 refers to the time taken for receiving the SUPL end message by the SET 30 after exchanging (transmitting) the final SUPL location message.

In the general SUPL procedure, when the SET receives the SUPL initiation message including the IP address, the SET is connected with the IP address and immediately transmits the SUPL position initiation message to the IP address. This can cause a problem especially when roaming is involved. When the SET, which has roamed from the H-SLP to the V-SLP, receives the SUPL initiation message, because the SLP to be connected for transmitting the SUPL position initiation message differs depending on whether the H-SLP uses the proxy mode or the non-proxy mode, the roaming SET needs to discriminate (distinguish) the SLP mode (proxy or non-proxy) of the system to determine to which SLP the SET is connecting.

Also, in non-proxy roaming cases, after receiving the SUPL initiation message, the SET can perform the SUPL procedure according to one of the following two methods.

The first method is that, after receiving the SUPL initiation message, the SET is immediately connected with the V-SPC address included in the message and performs the SUPL position information service. In this case, the non-protection channel is set between the SET and the V-SPC.

The second method is that, after receiving the SUPL initiation message, the SET is connected with the H-SLP, receives an authentication key to be used for mutual authentication with the V-SPC for performing the SUPL location information service with the SET, and then connection is performed with the V-SPC to perform the SUPL location information service. In this case, the protection channel is set between the SET and the V-SPC.

In this manner, in case of non-proxy roaming, the SET, which has received the SUPL initiation message, must discriminate the SLP to which a subsequent connection is to be made.

Thus, in order for the SET, which has received the SUPL initiation message, to discriminate the SLP to which the SET should be connected afterward, the H-SLP generates the SUPL initiation message proposed in the embodiments of the present invention.

The SUPL initiation message in accordance with the preferred embodiment of the present invention will be described as follows. The first embodiment of the SUPL initiation message will be described first and then the second embodiment of the SUPL initiation message will be described later.

To begin with, in the first embodiment of the present invention, the SUPL initiation message includes an SLP mode indicator for discriminating an SLP to which the terminal (SET) should be connected according to the proxy mode and the non-proxy mode. The SLP mode indicator may have one of a first value for indicating the non-proxy mode and a second value for indicating the proxy mode. For example, the SLP mode indicator can have either the first value such as 'TRUE' or the second value 'FALSE', or vice versa. In another example, the SLP mode indicator can be implemented by using a flag, and in that case, the SLP mode indicator indicates either the non-proxy mode or the proxy mode according to the value of the flag. For example, if the value of the flag is '1', the SLP mode indicator can indicate a non-proxy mode, and if the value of the flag is '0', the SLP mode indicator can indicate a proxy mode. In addition, the value of the flag can be applied in the opposite manner according to setting, or other parameter value(s) can be used to represent the SLP mode indicator.

In another example, in case of non-proxy roaming, when the SET needs to immediately set the non-protection channel with the V-SLP of the SLP address included in the SUPL initiation message, for example, the SUPL initiation message can include an SLP mode indicator having a third value or the SUPL initiation message may not include the SLP mode indicator.

FIG. 2 is a view showing an example of a format of a SUPL initiation message in accordance with the first embodiment of the present invention. Although not shown, the SUPL initiation message can include other known parameters.

As shown in FIG. 2, the SUPL initiation message in accordance with the present invention includes an SLP mode indicator (parameter) for indicating the proxy mode or the non-proxy mode together with a positioning method, a notification, an SLP address, a QoP (Quality of Positioning) parameter, and the like. Herein, as an example only, the SLP mode indicator is a flag. For instance, if the flag (SLP mode indicator) is set as true, then the present mode is a proxy mode, whereas if the flag is set as false, then the present mode is a non-proxy mode, or vice versa. The SLP address and the QoP are common parameters, and the SLP address can be set as an IP address of IPv4 or IPv6 or a URL value.

FIG. 3 is a view showing an example of a SUPL initiation message encoded by ASN.1 (Abstract Syntax Notation 1) in accordance with the present invention. The encoded content of the SUPL initiation message defines in detail such that a flag (SLP mode indicator) is added as a message parameter, if the flag is '1', it indicates the non-proxy roaming, and if the flag is '0', it indicates the proxy roaming.

FIG. 4 is a view showing an example of an SLP address encoded by the ASN.1 of the SUPL initiation message, FIG. 5 is a view showing an example of an IP address encoded by the ANS.1 included in the SLP address, and FIG. 6 is a view showing an example of a QoP parameter encoded by the ASN.1 of the SUPL initiation message. These examples merely demonstrate various ways of implementing the SLP mode indicator in a SUPL initiation (SUPL INIT) message according to the embodiments of the present invention.

The SUPL processing method in accordance with the present invention will now be described. The present methods can be implemented in the device(s) and/or systems shown in FIGS. 8-10 or in other suitable devices/systems. Conversely, the present device(s) and/or system(s) can be used to implement the methods of the present invention as desired.

First, in case of the non-proxy roaming, the H-SLP generates a SUPL initiation (SUPL INIT) message and transmits it to the SET (target terminal), whereby the SET can be connected with the H-SLP, verify the SUPL initiation message and then be connected with the V-SPC (or V-SLP) to transmit a SUPL position initiation (SUPL POS INIT) message to the V-SPC. Namely, the H-SLP adds the V-SPC address (or the V-SLP address) and the SLP mode indicator having the first value that indicates a non-proxy mode into the SUPL initiation message and transmits such SUPL initiation message to the SET according to the present invention.

Meanwhile, in case of the proxy roaming, the H-SLP generates the SUPL initiation message and transmits it to the SET, whereby the SET can be connected with the H-SLP and transmit the SUPL position initiation message to the H-SLP.

Namely, the H-SLP adds the SLP mode indicator that indicates a proxy mode into the SUPL initiation message and transmits such SUPL initiation message to the SET. In this case, the H-SLP can add also the H-SLP address in the SUPL initiation message (by using an SLP address parameter) to transmit the SUPL initiation message having the H-SLP address and SLP mode indicator, or can transmit the SUPL initiation message having the SLP mode indicator without the H-SLP address.

Figure 7:
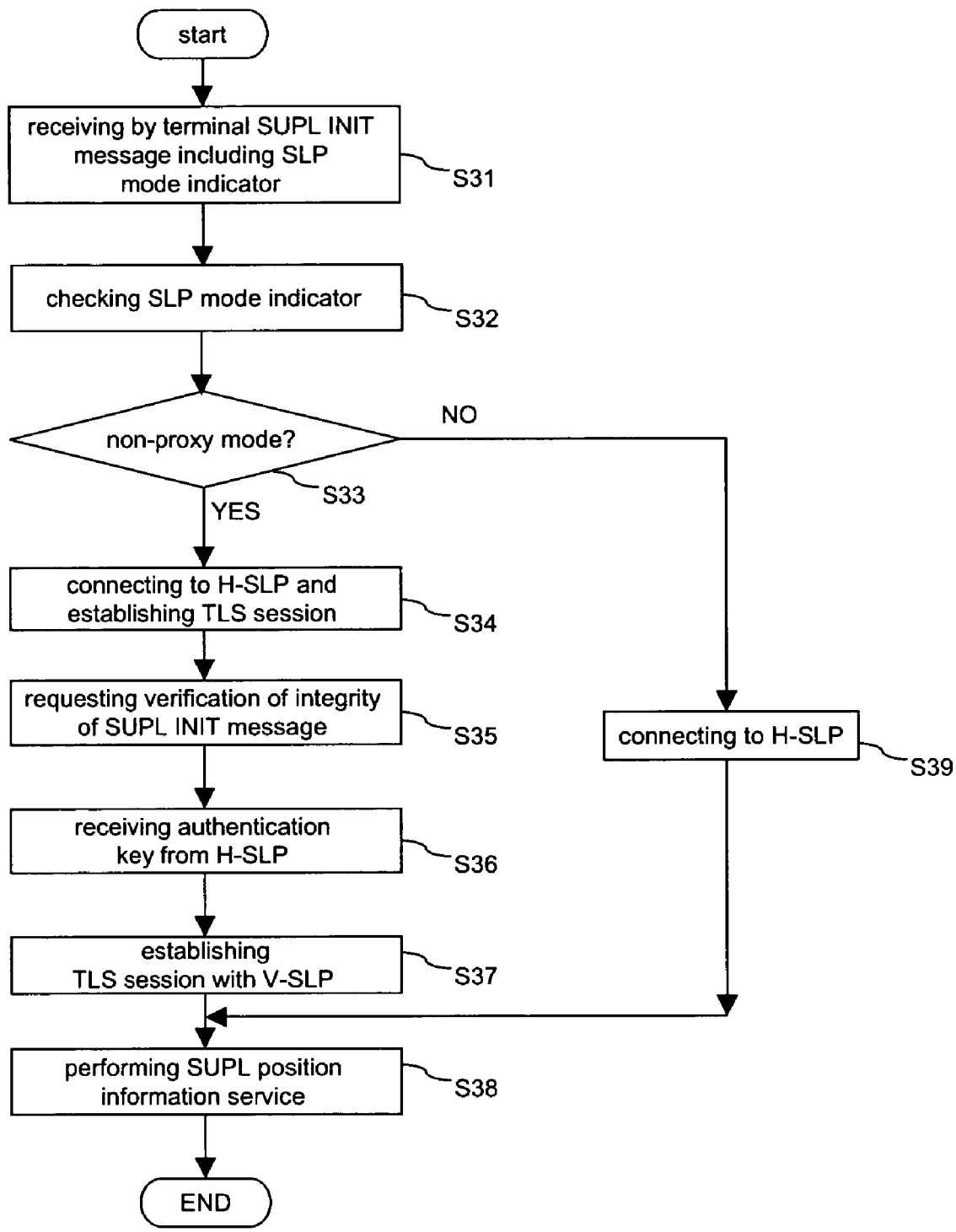
FIG. 7 is a flow chart illustrating the process of a SUPL processing method of a SET which has received the SUPL initiation message in accordance with an embodiment of the present invention.

FIG. 7 is a flow chart illustrating the process of a SUPL processing method of a SET which has received the SUPL initiation message in accordance with an embodiment of the present invention.

Referring to FIG. 7, when the SET (target terminal) receives the SUPL initiation message from the H-SLP (step S31), the SET checks the SLP mode indicator included in the SUPL initiation message (step S32). The SUPL initiation message is a message with a format defined in the first embodiment.

The SET discriminates a type of the SUPL operation according to the non-proxy mode or the proxy mode indicated by the SLP mode indicator and determines an SLP to which the SET should be connected according to the SLP mode indication.

When the SLP mode indicator indicates a non-proxy mode, e.g., when the SLP mode indicator has the first value that indicates the non-proxy mode (step S33), the SET then connects with the H-SLP to perform the procedure for sharing the authentication key (pre-shared key (PSK)). Accordingly, the SET stores the SLP address (e.g., the V-SPC address in case of roaming, or the H-SPC address in case of non-roaming) included in the SUPL initiation message, connects with the H-SLP corresponding to the provisioned SLP address (using the provisioned H-SLP address), and sets a TLS session with the H-SLP (step S34). The SET then requests the H-SLP to verify the SUPL initiation message through the TLS session. When the message verification is completed, the SET further receives from the H-SLP an authentication key (e.g., the PSK) for setting a protection channel (e.g., a TLS session) with the V-SPC of the stored SLP address (step S36), e.g., in case of non-proxy roaming. The SET sets a protection channel with the V-SPC by using the received authentication key (step S37) and the stored SLP address (the V-SPC address), and then transmits a SUPL position initiation (SUPL POS INIT) message to the V-SPC through the set protection channel (step S38). The SUPL POS INIT message is a response to the SUPL INIT message.

Herein, the provisioned SLP address, namely, the H-SLP address, can be provided to the SET by the H-SLP itself by using a provisioning message/technique known, or can be inserted in a permanent memory when the SET is fabricated.

On the other hand, at step S33, when the SLP mode indicator does not indicate the non-proxy mode, namely, when the SLP mode indicator has the second value that indicates a proxy mode, the SET connects with the H-SLP and directly transmits the SUPL position initiation (SUPL POS INIT) message to the H-SLP (step S39). At this time, the H-SLP operates as a proxy. Here, the address of the H-SLP can be included in the SUPL initiation message received by the SET, the H-SLP itself can inform the SET by using a provisioning message separately from the SUPL initiation message, or the address of the H-SLP can be inserted in a permanent memory of the SET when the SET is fabricated. Step S39 is applicable to both roaming and non-roaming cases.

At step S32, if the SUPL initiation message does not include the SLP mode indicator, the SET can immediately set a non-protection channel to the V-SLP of the SLP address included in the SUPL initiation message and transmit the SUPL position initiation message to the V-SLP through the non-protection channel, e.g., in non-proxy roaming case, or to other appropriate SLP.

Figure 8:
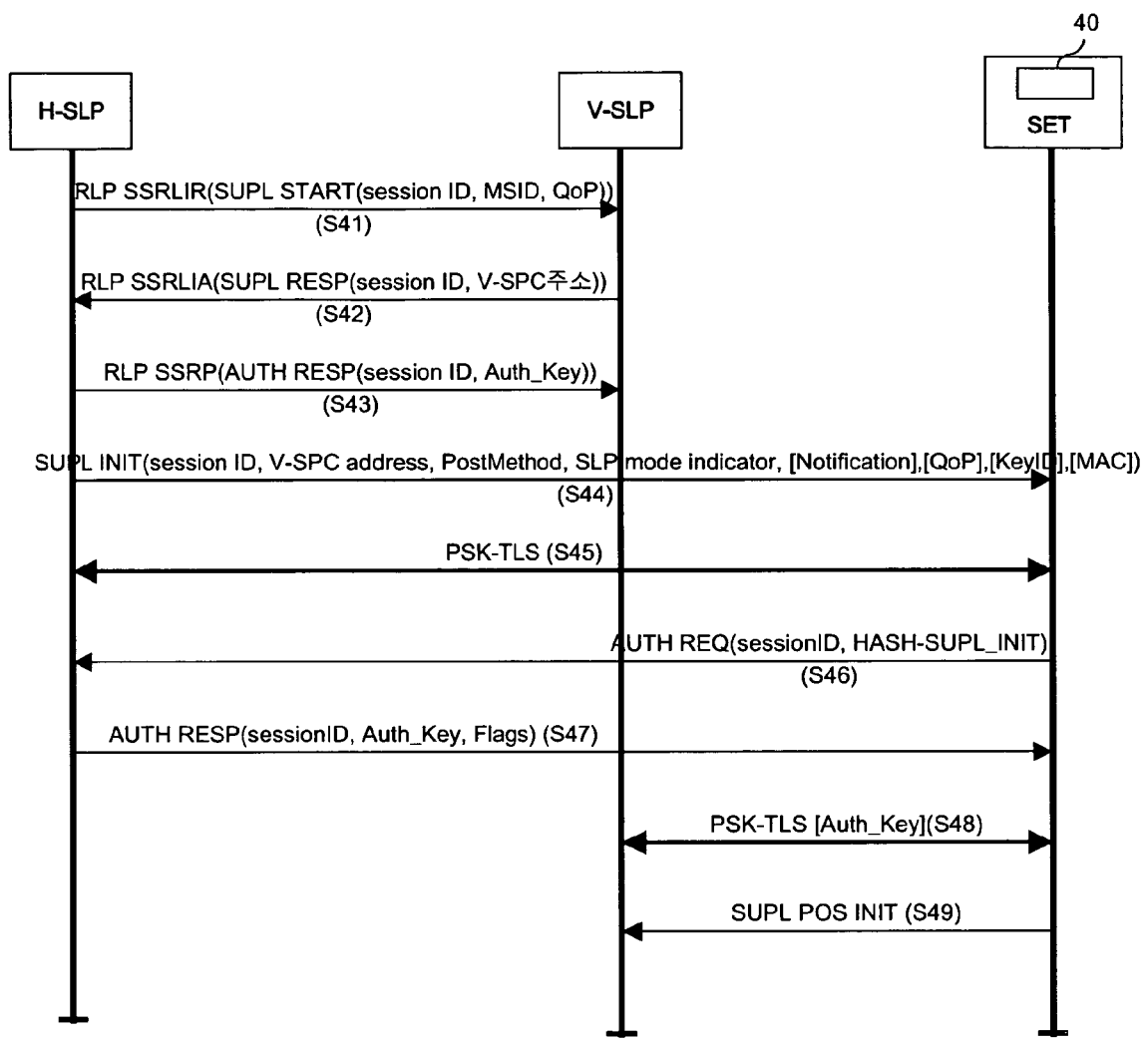
FIG. 8 shows an example of the SUPL processing method in case of a non-proxy roaming in accordance with an embodiment of the present invention.

FIG. 8 shows one example of the SUPL processing method in case of the non-proxy roaming in accordance with an embodiment of the present invention. It is shown that a SET, which has received a SUPL initiation message of the present invention from its H-SLP, sets a protection channel with a V-SPC with permission of the H-SLP and performs the SUPL procedure with the V-SPC. The SET includes a processor 40 which performs processing of the SLP mode indicator included in the SUPL initiation message, and other functions as needed. The processor 40 can be implemented using computer software, and is not limited to one component but can be a collection of components in the SET. The SET also includes known components that are operatively configured. Although the processor 40 is shown only in FIG. 8, each SET (target terminal) mentioned herein according to the present invention includes such processor means to execute the steps that are discussed in connection with that SET as needed.

Now generally referring to FIG. 8, when the H-SLP informs the SET about an SLP to which the SET should be connected by using the SUPL initiation message including the SLP mode indicator, the SET checks the received SUPL initiation message, recognizes the SLP to which the SET should be connected (proxy or non-proxy), and determines the following operation.

In this regard, first, the process for confirming that the target SET (referred to hereinafter as 'SET') is a roaming SET and transmitting a SUPL start message by the H-SLP to start the SUPL procedure will be described.

The H-SLP transmits the SUPL start message (step S41) and receives a SUPL response message from the V-SLP to obtain an address of the V-SLP (e.g., the V-SPC address) (step S42).

The H-SLP randomly generates an authentication key (Auth_Key), namely, a symmetric key (pre-shared key (PSK)) to be used between the V-SLP and the SET, and transmits the generated authentication key to the V-SLP through an RLP (Roaming Location Protocol) SSRP (Standard SUPL Roaming Position) message (step S43). In this case, the authentication key is used as an authentication result between the V-SLP and the SET, and used as the symmetric key (PSK) when a PSK-TLS session is established between the V-SLP and the SET. As a variation, step S43 can be moved and performed between steps S46 and S47 instead.

The H-SLP adds an SLP address having an address value with respect to an SLP to which the roaming SET should be connected for performing the SUPL procedure and an SLP mode indicator for indicating either the proxy mode or the non-proxy mode, into the SUPL initiation message. Herein, the SLP address included in the SUPL initiation message is the V-SPC address (since the case is non-proxy roaming) and the SLP mode indicator indicates the non-proxy mode.

The H-SLP then transmits the SUPL initiation message to the SET, and starts the SUPL procedure with the SET (step S44). In this case, the SUPL initiation message includes at least a session ID, the V-SPC address (SLP address), the SLP mode indicator and a positioning (location tracking) method to be used. The SUPL initiation message can also include a notification parameter in case where the H-SLP needs to provide a notification related to location information to a user after checking privacy of the SET.

The SET (e.g., the processor 40) then checks the SLP mode indicator included in the received SUPL initiation message and determines the mode (proxy or non-proxy) of the system and thus the SLP to which the SET should be connected according to the proxy mode or the non-proxy mode.

When the SLP mode indicator indicates the non-proxy mode, the SET determines to set a protection channel with the H-SLP and perform a procedure for verifying the SUPL initiation message. Accordingly, the SET establishes a PSK-TLS session with the H-SLP (step S45). And then, in order to verify the integrity of the SUPL initiation message received from the H-SLP and determine whether to re-use it or not, the SET transmits a value hashed by using a hash algorithm such as an SHA (Secure Hash Algorithm) or the like to the H-SLP through an authentication request message (AUTH REQ) (step S46). Here in lieu of the hash algorithm, other encryption techniques can be used.

The H-SLP verifies the integrity of the SUPL initiation message and whether to re-use it or not by using the hash value of the SUPL initiation message, and if the SUPL initiation message is successfully verified, the H-SLP transmits an authentication response message (AUTH RESP) including the authentication key (Auth_Key) to the SET through the established PSK-TLS session (step S47).

Now, since both the V-SLP and the SET have the authentication key (Auth_Key), the SET establishes the PSK-TLS with the V-SLP by using the authentication key (Auth_Key) (step S48) based on the stored SLP (e.g., V-SPC) address. The SET transmits the SUPL position initiation message to the V-SLP (i.e., V-SPC) through the established PSK-TLS session to perform the SUPL position confirmation procedure (step S49). Accordingly, the present invention provides an effective way to perform the SUPL procedure using the SLP mode indicator.

Figure 9:
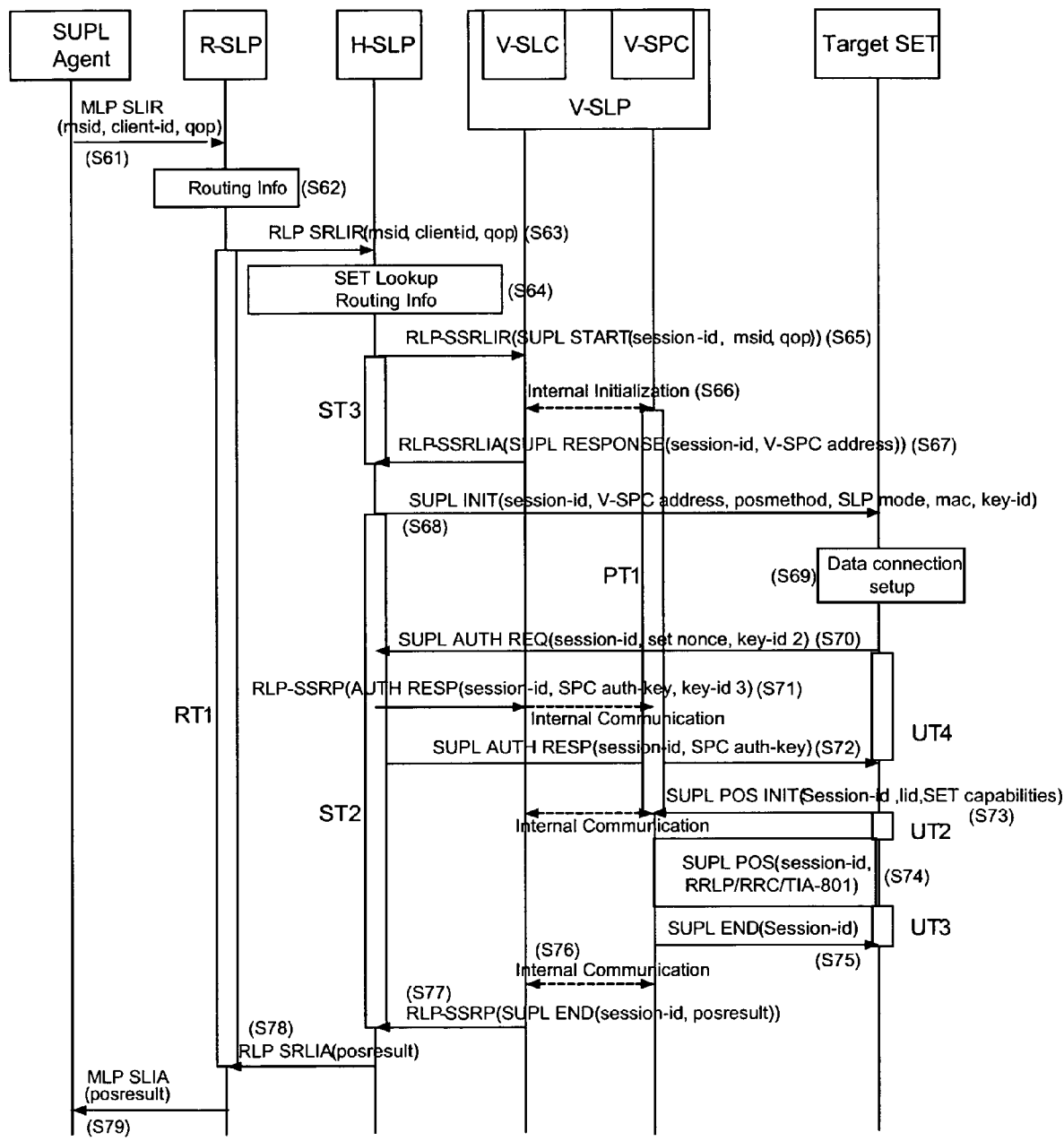
FIG. 9 shows another example of the SUPL processing method in case of a non-proxy roaming in accordance with an embodiment of the present invention.

FIG. 9 shows another example of the SUPL processing method in case of a non-proxy roaming in accordance with an embodiment of the present invention. The SUPL processing method of FIG. 9 is similar to that of FIG. 8, but is different in that the V-SLP includes the V-SLC and the V-SPC and the SET sets the V-SPC and a protection channel.

Referring to FIG. 9, first, a SUPL agent transmits an MLP (Mobile Location Protocol) SLIR (Standard Location Immediate Request) message to a requesting SLP (R-SLP) to request a location of a target SET (referred to hereinafter as 'SET) (step S61).

The R-SLP authenticates the SUPL agent by using a client ID included in the MLP SLIR message. And then, the R-SLP determines a pertinent H-SLP by using routing information based on an ID (msid) of the SET included in the LMP SLIR message (step S62).

The R-SLP transfers a positioning (location checking) request to the pertinent H-SLP through an RLP (Roaming Location Protocol) SRLIR (Standard Roaming Location Immediate Request) message (step S63).

The pertinent H-SLP checks whether the SET is a roaming SET or not by using the routing information and verifies whether or not the SET supports the SUPL with reference to a SET look-up table (step S64).

Thereafter, the H-SLP allocates a session ID for a SUPL session and determines whether the V-SPC performs position calculation. Herein, if the V-SLP includes the V-SLC and the V-SPC and the V-SPC performs the position calculation, in order to inform the V-SLC of the V-SLP that the SET will initiate the SUPL positioning procedure, the H-SLP transmits SUPL start information including the session ID, the ID of the SET (msid) and QoP (Quality of Position), etc., to the V-SLC through an RLP SSRLIR (Standard SUPL Roaming Location Immediate Request) message (step S65).

The V-SLC sets an internal communication path with the V-SPC, informs the V-SPC about incoming of the SUPL positioning session and performs internal initialization with the V-SPC (step S66).

The V-SLC then informs the H-SLP that the V-SPC is ready to initiate a SUPL positioning procedure through an RLP SSRLIA (Standard SUPL Roaming Location Immediate Answer) message. In this case, the RLP SSRLIA message includes the address of the V-SPC.

The H-SLP transmits the SUPL initiation (SUPL INIT) message to the SET to start the SUPL procedure with the SET (step S68). In this case, the SUPL initiation message includes at least the session-ID, the V-SPC address, the SLP mode indicator, a key ID, a message authentication code (MAC) and an intended positioning method. The key ID is used to discriminate a key for calculating the MAC, and the MAC is used to verify integrity of the SUPL initiation message. The SUPL initiation message can also include a notification parameter for indicating whether to provide a notification related to the location information to a user or not after the H-SLP checks privacy of the SET. In addition, the SUPL initiation message can include the QoP parameter.

After the SET receives the SUPL initiation message, if a data connection is not currently opened to any network, the SET request a data connection from a packet data network (3GPP or 3GPP2, etc.) (S69).

And then, in order to verify the received SUPL initiation message, the SET uses the Key ID and the MAC parameter included in the SUPL initiation message. For instance, the SET obtains hash values by hashing the Key ID, the MAC and the SUPL initiation message by using the hash algorithm such as SHA (Secure Hash Algorithm). Other encryption techniques can be used.

In addition, in order to determine whether the H-SLP uses the proxy mode or the non-proxy mode, the SET checks the SLP mode indicator included in the SUPL initiation message. Upon checking the SLP mode indicator, if the SET determines that the non-proxy mode is used, the SET recognizes that the SET should be authenticated by the H-SLP, should set the protection channel with the V-SLP and should perform the SUPL positioning procedure. Thus the SET makes a connection to the H-SLP.

The SET connects, through the protection channel, to the H-SLP of the provisioned SLP address. Herein, the protection channel is, for example, the PSK TLS, In order to request authentication of the SUPL initiation message, the SET transmits a SUPL authentication request message (SUPL AUTH REQ) to the H-SLP through the protection channel (step S70). The SUPL authentication request message includes the hash values. The hash values include the key-id 2 and SET nonce.

The H-SLP receives the SUPL AUTH REQ and generates an SPC authentication key (SPC auth-key) to be used for mutual authentication between the V-SPC and the SET by using the key-id 2 and the SET nonce included in the SUPL authentication request message. The SPC authentication key (key id 3) is used to establish the PSK-TLS session between the V-SPC and the SET. The H-SLP then transmits the SPC authentication key to the V-SLC through an RLP SSRP (Standard SUPL Roaming Position) message (step S71). The V-SLC transfers the SPC authentication key to the V-SPC through internal communication.

Meanwhile, the H-SLP returns the SUPL authentication response (SUPL AUTH RESP) message to the SET (step S72). The SUPL AUTH RESP message includes a session id and the SPC auth-key.

Since the SET and the V-SPC share the SPC auth key, the SET then establishes a PSK-TLS session with the V-SPC by using the SPC auth-key, and transmits the SUPL position initiation (SUPL POS INIT) message in a stable and secure manner (step S73).

The SUPL position initiation message includes at least the session id, SET capabilities and a location identifier (lid). The SET capabilities include a supported location tracking method (e.g., SET-assisted A-GPS, SET-based A-GPS, etc.). The V-SPC informs the V-SLC that the location tracking procedure has been started.

The SET and the V-SPC exchange continuous messages to perform the actual positioning tracking, and calculate the location of the SET through the continuous messages for positioning (step S74). Either the SET or V-SPC can actually perform the location calculation.

When the location of the SET is calculated, the V-SPC transmits a SUPL end message to the SET so that the SET may end the SUPL procedure (step S75).

The SET releases the PSK-TLS session connected with the V-SPC, and the V-SPC transmits the calculated location information (posresult) of the SET through internal communication (step S76).

The V-SLC informs the H-SLP that the calculated location information of the SET and the SUPL procedure has been ended through an RLP SSRP message (step S77). Then, the H-SLP transmits the calculated location information (posresult) of the SET to the R-SLP through an RLP SRLIA (Standard Roaming Location Immediate Answer) message and releases every allocated resource (step S78). The R-SLP transmits the calculated location information (posresult) of the SET to the SUPL agent (step S79).

Figure 10:
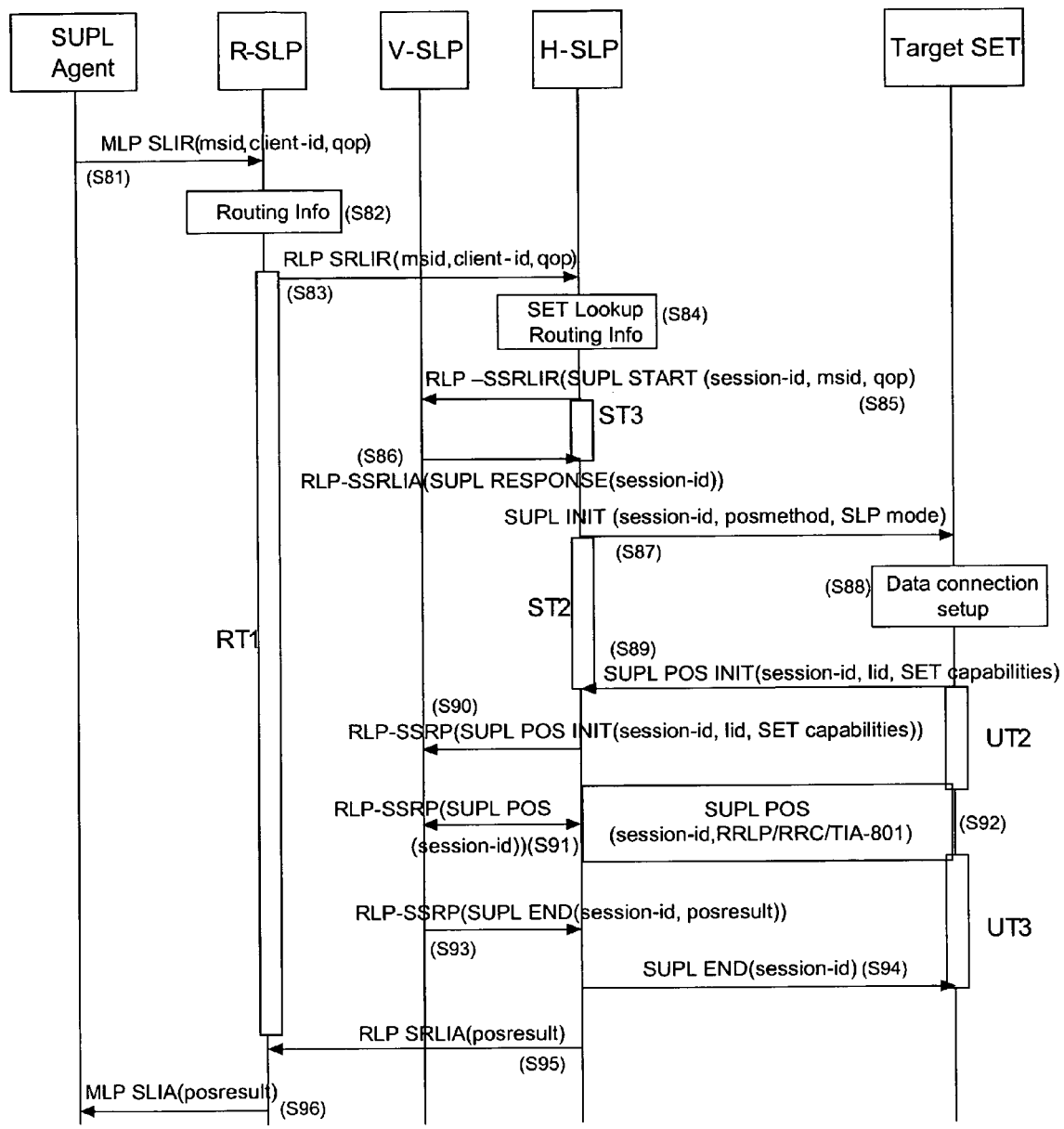
FIG. 10 shows an example of the SUPL processing method in case of a proxy roaming in accordance with an embodiment of the present invention.

FIG. 10 shows an example of the SUPL processing method in case of a proxy roaming in accordance with an embodiment of the present invention.

In the SUPL processing method as shown in FIG. 10, the SET, which has received the SUPL initiation message, is connected with the H-SLP operating as a proxy, and transmits the SUPL position initiation message to the H-SLP.

First, the operations in steps S81~S85 are similar to those of the steps S61~S65 in FIG. 9, so only the procedures starting from step S86 will be explained merely for the sake of brevity.

The V-SLP informs the H-SLP that the SUPL positioning procedure is ready to start through an RLP SSRLIA (Standard SUPL Roaming Location Immediate Answer) message (step S86).

Then, the H-SLP transmits the SUPL initiation (INIT) message to the SET to start the SUPL procedure with the SET (step S87). In this case, the SUPL initiation message may include at least a session ID, the SLP mode indicator and an intended positioning method. The SUPL initiation message may also include a key ID, a message authentication code (MAC) and a QoP. The key ID is used to discriminate a key for calculating the MAC, and the MAC is used to verify the integrity of the SUPL initiation message. The SUPL initiation message can include a notification parameter for indicating whether to provide a notification related to the location information to a user or not after the H-SLP checks privacy of the SET. In this example, the SUPL initiation message may not include an SLP address.

After the SET receives the SUPL initiation message, if a data connection is not currently opened to any network, the SET requests a data connection from a packet data network (3GPP or 3GPP2, etc.) (S88). If the SUPL initiation message includes the key ID and the MAC parameter, the SET can use them to verify the SUPL initiation message at step S88.

Thereafter, in order to recognize which one of the proxy mode and the non-proxy mode the H-SLP uses, the SET checks the SLP mode indicator included in the SUPL initiation message. Upon checking the SLP mode indicator, if the SET determines that the proxy mode is used, the SET recognizes that it should be connected to the H-SLP operating as a proxy.

Thus, the SET connects, though the protection channel, to the H-SLP of the provisioned SLP address. The provisioned SLP address (e.g., the H-SLP address) can be transmitted by using a provisioning message by the H-SLP or can be stored in the SET memory when the SET is manufactured as discussed above. Herein, the protection channel can be, for example, the PSK TLS. The SET then transmits a SUPL position initiation (SUPL POS INIT) message which is a response message of the SUPL initiation (SUPL INIT) message, to the H-SLP through the established protection channel (step S89). The SUPL position initiation message may include at least the session id, SET capabilities, the hash value of the SUPL initiation and a location identifier (lid).

The H-SLP checks the hash value of the SUPL initiation (SUPL INIT) message included in the SUPL position initiation (SUPL POS INIT) message and the hash value calculated by using its SUPL initiation (SUPL INIT) message. If the two hash values are identical, then the H-SLP verifies the authenticity of the SUPL position initiation message and transmits the SUPL position initiation message to the V-SLP through a tunnel or the like (step S90).

Then, the V-SLP determines a location tracking procedure based on the SUPL position initiation message including a location tracking procedure (posmethod) supported by the SET.

Thereafter, the SET exchanges continuous messages for performing actual positioning tracking with the V-SLP. The V-SPC or SET calculates the location of the SET through the continuous messages for the positioning (steps S91 and S92).

After the location of the SET is calculated, the V-SLP transmits a SUPL end message to the H-SLP to inform the termination of the SUPL procedure (step S93), and the H-SLP informs the SET about the termination of the SUPL procedure and releases resources (step S94). The subsequent steps (S95 and S96) are performed in the same manner as steps S78 and S79 of FIG. 9.

According to another example of the present invention, in case of non-proxy roaming, the SET can immediately set the non-protection channel to the V-SPC (or V-SLP) and transmit the SUPL position initiation message to the V-SPC. Here, the H-SLP may not include the SLP mode indicator but includes the V-SPC address (or V-SLP address) and transmit the SUPL initiation message to the SET. In this case, the SET recognizes that the SLP mode indicator is not included in the SUPL initiation message and immediately sets the non-protection channel to the SLP corresponding to the SLP address, namely, the V-SPC (or V-SLP), included in the SUPL initiation message and transmits the SUPL position initiation message.

A SUPL initiation message in accordance with a second embodiment of the present invention will now be described.

First, the format in accordance with the second embodiment of the SUPL initiation message will be explained as follows.

In the second embodiment of the SUPL initiation message in accordance with the present invention, a SUPL initiation message includes a first SLP address of an SLP to which the roaming terminal should be connected with to perform the SUPL positioning procedure and a second SLP address of an SLP to which the roaming terminal should be connected to share the authentication key (symmetric key). The first SLP address can be the V-SLP address (or V-SPC address) or the H-SLP address. The second SLP address can be the H-SLP address.

FIG. 11 shows an example of a format of a SUPL initiation message according to the second embodiment, which includes first and second SLP address parameters.

In the SUPL-based location information system, in order to indicate an SLP to which the roaming terminal (which has received the SUPL initiation message) should be connected, the H-SLP selectively includes the first and second SLP addresses in the SUPL initiation message and transmits such SUPL initiation message to the target terminal (SET)

Namely, in order to authenticate the roaming terminal (which has received the SUPL initiation message) by first being connected with the H-SLP, and then set the protection channel with the V-SLP to perform the SUPL positioning procedure, the H-SLP may add both the first and second SLP addresses in the SUPL initiation message.

And in order for the roaming terminal (which has received the SUPL initiation message) to be directly connected with the V-SLP (or V-SPC) to perform the SUPL positioning procedure through the non-protection channel, the H-SLP generates the SUPL initiation message including only the first SLP address.

Upon receiving the SUPL initiation message, the roaming terminal determines an SLP to which it should be connected to according to whether the first and second SLP addresses exist in the SUPL initiation message.

FIG. 12 is a view showing an example of the SUPL initiation message encoded by the ASN.1 according to the second embodiment of the present invention. As shown in FIG. 12, when a definition for the SPC address (namely, the second SLP address) is added and both the first and second SLP address fields exist, the terminal is connected to the second SLP address and is authenticated.

FIG. 13 is a flow chart illustrating the processes of an example of a SUPL processing method of the SET (target terminal), which has received the SUPL initiation message in accordance with the second embodiment of the present invention.

Referring to FIG. 13, the terminal (SET) receives the SUPL initiation message from the H-SLP and checks whether the first and second SLP addresses are included in the received SUPL initiation message (step S101).

If the first and second SLP addresses are provided in the corresponding first and second SLP address parameters (step S102), the terminal recognizes that the H-SLP uses the non-proxy mode and that the terminal should open the protection channel with the V-SLP after confirmation of the H-SLP to perform the SUPL positioning service. Accordingly, the terminal is first connected with the H-SLP, verifies the SUPL initiation message, receives the authentication key, and sets the protection channel (e.g., TLS session) with the V-SLP based on the authentication key (steps S103-S106). These steps are similar to the steps discussed above in the first embodiment. The terminal then transmits the SUPL position initiation message through the protection channel and performs the SUPL positioning procedure with the V-SLP (step S107).

On other hand, if only the first SLP address (among the first and second SLP address parameters) is included at the first SLP address parameter of the SUPL initiation message (without the second SLP address), the terminal determines the mode to be a non-proxy mode and sets the non-protection channel with the V-SLP, directly opens the non-protection channel with the V-SLP, and transmits the SUPL position initiation message (steps S108, S107).

Thus, the process of FIG. 13 is generally applicable to non-proxy roaming cases, wherein the first and second SLP addresses are used to discriminate whether the terminal should be connected directly to the V-SLP or should be first connected to the H-SLP and then to the V-SLP using the authentication key received from the H-SLP, when the H-SLP is in the non-proxy mode. As such, the process of FIG. 13 may be used in conjunction with the SLP mode indicator of the first embodiment, which indicates whether the present operation mode is a proxy or non-proxy mode.

As a variation, according to the present invention, the first and second SLP addresses in the SUPL initiation message may function as an SLP mode indicator. For instance, if there are both first and second SLP addresses present in the SUPL initiation message, then the terminal may determine that the system operates in a non-proxy mode and operate according to the non-proxy mode. If there is the first SLP address without the second SLP address in the SUPL initiation message (e.g., the second SLP address parameter has a zero or null value), then the terminal may determine that the system operates in a proxy mode and operate according to the proxy mode.

According to the present invention, the terminal is generally a mobile terminal, but is not limited thereto. Examples of the terminal can be, but not limited to, a mobile phone, a UE (user equipment) for UMTS or the like, an MS (mobile station) for GSM or the like, a laptop computer, a PDA (personal digital assistant), various types of mobile terminals connected through the WLAN or other network, etc.

The method(s) of the present invention can be implemented in part by using existing computer programming language. Such computer program(s) may be stored in portable or other types of storages or memories such as hard drive, RAM, ROM, PROM, etc. associated with one or more computers or computer-based devices. Alternatively, such computer program(s) may be stored in a different storage medium such as a USB, magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

As so far described, the SUPL initiation message in a location information system, and a terminal, method and system for processing SUPL by using the SUPL initiation message in accordance with the embodiments of the present invention have many advantages.

For instance, when the SUPL procedure starts, the roaming terminal (which has received the SUPL initiation message) can check the SLP mode indicator included in the SUPL initiation message and determines whether to be connected with the H-SLP or with the V-SLP (or V-SPC) according to the non-proxy mode or the proxy mode of the H-SLP. Therefore, an effective and accurate SUPL processing system and method are provided.

Second, since the roaming terminal (which has received the SUPL initiation message) can determine whether it should be directly connected to the V-SLP or whether it should be connected to the V-SLP after receiving the authentication key from the H-SLP to perform the SUPL position service, an effective and accurate SUPL processing system and method are provided.

Third, since the roaming terminal (which has received the SUPL initiation message) can determine whether to be connected with the H-SLP or with the V-SLP (V-SPCO by checking the first and second SLP address parameters included in the SUPL initiation message, the SUPL procedure can be performed in a seamless manner.

The foregoing embodiments and advantages are merely exemplary and are not to be construed as limiting the present invention. The present teachings can be readily applied to other types of apparatuses and/or systems. The description of the preferred embodiments of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of processing a SUPL (Secure User Plane Location) request for a terminal that has performed roaming, the method comprising:

receiving a SUPL INIT message from a home SLP (SUPL Location Platform) entity, the SUPL INIT message including an indicator that indicates a proxy mode or a non-proxy mode;

checking the indicator to determine whether to establish a SUPL positioning session with a visited SPC (SUPL Positioning Center) entity; and transmitting a SUPL POS INIT message to the visited SPC entity when the indicator indicates the non-proxy mode.

2. The method of claim 1, wherein if the indicator indicates the non-proxy mode, the method further comprises sending a SUPL authentication request to the home SLP entity before transmitting the SUPL POS INIT message to the visited SPC entity.

3. The method of claim 1, wherein if the indicator indicates the non-proxy mode, the transmitting step transmits the SUPL POS INIT message to the visited SPC entity to establish the SUPL positioning session with the visited SPC entity.

4. A terminal for processing a SUPL request upon roaming, the terminal comprising:

a transceiver configured to receive a SUPL INIT message from a home SLP entity, the SUPL INIT message including an indicator that indicates a proxy mode or a non-proxy mode, the transceiver further configured to transmit a SUPL POS INIT message to the visited SPC (SUPL Positioning Center) entity when the indicator indicates the non-proxy mode; and a processor, in cooperation with the transceiver, configured to check the indicator to determine whether the indicator indicates the proxy mode or the non-proxy mode to establish a SUPL positioning session with the visited SPC entity.

5. The terminal of claim 4, wherein if the indicator indicates the non-proxy mode, the processor and the transceiver cooperate to send a SUPL authentication request to the home SLP entity before transmitting the SUPL POS INIT message to the visited SPC entity.

* * * * *